United States Patent
Zavesky et al.

(10) Patent No.: US 10,922,534 B2
(45) Date of Patent: Feb. 16, 2021

(54) IDENTIFYING AND ADDRESSING OFFENSIVE ACTIONS IN VISUAL COMMUNICATION SESSIONS

(71) Applicant: AT&T Intellectual Property I, L.P., Atlanta, GA (US)

(72) Inventors: Eric Zavesky, Austin, TX (US); Zhu Liu, Marlboro, NJ (US); Bernard S. Renger, New Providence, NJ (US); Behzad Shahraray, Holmdel, NJ (US); Lee Begeja, Gillette, NJ (US); Paul Triantafyllou, Summit, NJ (US)

(73) Assignee: AT&T INTELLECTUAL PROPERTY I, L.P., Atlanta, GA (US)

( * ) Notice: Subject to any disclaimer, the term of this patent is extended or adjusted under 35 U.S.C. 154(b) by 0 days.

(21) Appl. No.: 16/171,944

(22) Filed: Oct. 26, 2018

(65) Prior Publication Data

US 2020/0134298 A1    Apr. 30, 2020

(51) Int. Cl.
| | |
|---|---|
| *G06K 9/00* | (2006.01) |
| *H04N 7/15* | (2006.01) |
| *G06T 13/40* | (2011.01) |
| *G06N 20/00* | (2019.01) |
| *G06F 3/01* | (2006.01) |

(52) U.S. Cl.
CPC ......... *G06K 9/00335* (2013.01); *G06N 20/00* (2019.01); *G06T 13/40* (2013.01); *H04N 7/157* (2013.01); *G06F 3/011* (2013.01)

(58) Field of Classification Search
USPC ....................................................... 348/14.1
See application file for complete search history.

(56) References Cited

U.S. PATENT DOCUMENTS

| | | | |
|---|---|---|---|
| 7,865,590 B2 | 1/2011 | Zalewski | |
| 8,199,160 B2 | 6/2012 | Hauke | |
| 9,323,797 B2 | 4/2016 | Acree | |
| 2006/0268101 A1* | 11/2006 | He | H04N 7/147 348/14.12 |
| 2008/0298571 A1* | 12/2008 | Kurtz | H04N 7/142 379/156 |
| 2009/0111583 A1 | 4/2009 | Zalewski et al. | |
| 2014/0365574 A1 | 12/2014 | Franks et al. | |
| 2016/0241812 A1* | 8/2016 | Lu | H04N 7/15 |
| 2017/0102480 A1 | 4/2017 | Rosenblum et al. | |
| 2017/0364753 A1 | 12/2017 | Ahuja et al. | |
| 2018/0200603 A1 | 7/2018 | Allen et al. | |

\* cited by examiner

*Primary Examiner* — Amal S Zenati

(57) ABSTRACT

A processing system having at least one processor may establish a communication session between a first communication system of a first user and a second communication system of a second user, the communication session including first visual content, the first visual content including a first visual representation of the first user, and detecting a first action of the first visual representation in the first visual content in accordance with a first action detection model. The processing system may modify, in response to the detecting the first action, the first visual content in accordance with a first configuration setting of the first user for the communication session, which may include modifying the first action of the first visual representation of the first user in the first visual content. In addition, the processing system may transmit the first visual content that is modified to the second communication system of the second user.

20 Claims, 3 Drawing Sheets

IDENTIFYING AND ADDRESSING OFFENSIVE ACTIONS IN VISUAL COMMUNICATION SESSIONS

The present disclosure relates generally to visual communication sessions, and more particularly to methods, computer-readable media, and devices for detecting and modifying actions of visual representations of users in visual content.

BRIEF DESCRIPTION OF THE DRAWINGS

The teachings of the present disclosure can be readily understood by considering the following detailed description in conjunction with the accompanying drawings, in which.

To facilitate understanding, identical reference numerals have been used, where possible, to designate identical elements that are common to the figures.

DETAILED DESCRIPTION

Figure 1:
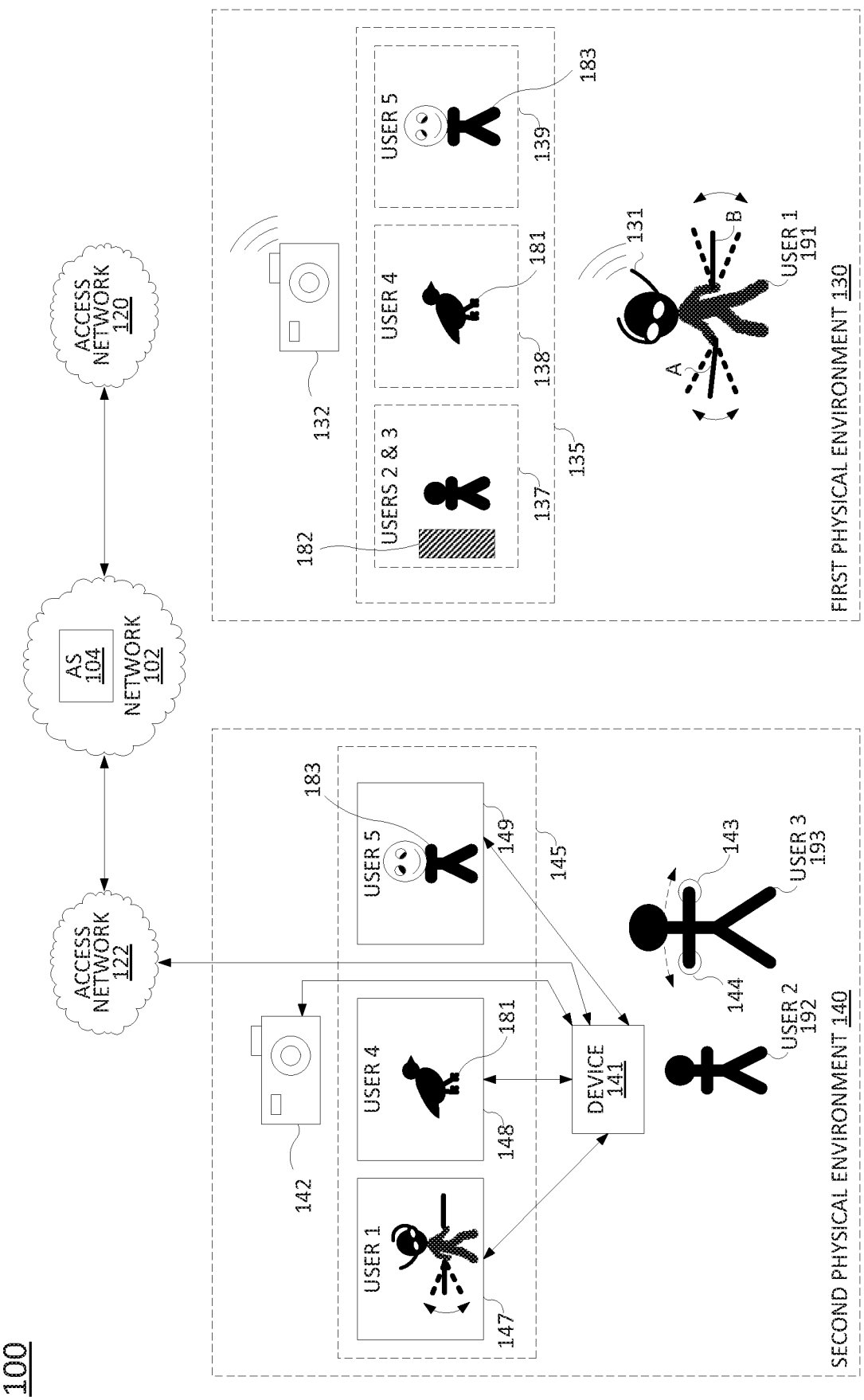
FIG. 1 illustrates an example network related to the present disclosure.

In one example, the present disclosure describes a method, computer-readable medium, and device for detecting and modifying actions of visual representations of users in visual content. For instance, in one example, a method may include a processing system having at least one processor establishing a communication session between at least a first communication system of a first user and a second communication system of a second user, the communication session including first visual content, the first visual content including a first visual representation of the first user, and detecting a first action of the first visual representation of the first user in the first visual content in accordance with a first action detection model for detecting the first action. The processing system may then modify, in response to the detecting the first action, the first visual content in accordance with a first configuration setting of the first user for the communication session, which may include modifying the first action of the first visual representation of the first user in the first visual content based upon the first configuration setting. In addition, the processing system may transmit the first visual content that is modified to the second communication system of the second user.

Mixed reality (MR), augmented reality (AR), virtual reality (VR), or video-based communication sessions, such as calls, video game environments, group hangouts, and the like may include participants who are inclined to disregard social norms that would typically be employed in everyday personal interactions. A service providing the infrastructure supporting the communication session may allow participants to indicate to the system that another's activity is objectionable. However, there may be a negative stigma associated with reporting offensive actions that deters some participants from reporting even clearly objectionable behavior. This lack of reporting may also allow the objectionable behavior to continue and affect additional users. The service may further rely upon human reviewers to investigate complaints, review recorded visual information and other context information, and make determinations as to whether to warn, block, or otherwise address offending participants. Determining what is offensive is a subjective determination that is difficult to enforce consistently and may subject the service provider to criticism from the complaining party or the accused party, either or both of whom may be dissatisfied with the service provider's solution to handling the complaint.

Examples of the present disclosure include a processing system that supports visual communication sessions and that detects and addresses actions that are deemed offensive within the personal opinions of particular participants. In one example, the processing system passively and continuously observes participants' activities on the platform to determine contexts and particular actions. In one example, the processing system may maintain action detection models for detecting respective objectionable actions but may not require that these actions be specifically labeled as particular actions (e.g., offensive gesture, offensive end-zone dancing, etc.). For example, the type of action detection model may remain unlabeled, yet future instances of the action may be blocked/manipulated in the visual content. In one example, the processing system engages in continuous learning of anomalous and potentially objectionable actions from the visual content, without initially marking events as objectionable.

The types of features from which action detection models may be derived may include visual features from visual content segments. For instance, segments of visual content having "unusual" features may be determined via a comparison of features from one or more frames in a given time window versus "normal" or average features from a larger time period. The features may include low-level invariant image data, such as colors (e.g., RGB (red-green-blue) or CYM (cyan-yellow-magenta) raw data (luminance values) from a CCD/photo-sensor array), shapes, color moments, color histograms, edge distribution histograms, etc. Visual features may also relate to movement in a video and may include changes within images and between images in a sequence (e.g., video frames or a sequence of still image shots), such as color histogram differences or a change in color distribution, edge change ratios, standard deviation of pixel intensities, contrast, average brightness, and the like. In one example, the system may perform image salience detection processes, e.g., applying an image salience model and then performing an image recognition algorithm over the "salient" portion of the image(s). Thus, in one example, visual features may also include a recognized object (e.g., including parts of a human body such as legs, arms, hands, etc.), a length to width ratio of an object, a velocity of an object estimated from a sequence of images (e.g., video frames), and so forth. Features may additionally be taken from wearable device inputs such as gyroscope and compass measurements from various points of a human body, eye movements, and so forth.

In one example, an action detection model, or "signature" may be created that represents a particular action. The action detection model may comprise a machine learning algorithm (MLA), or machine learning model (MLM) trained via the MLA and which may comprise, for example, a deep learning neural network, or deep neural network (DNN), a generative adversarial network (GAN), a support vector machine (SVM), e.g., a binary, non-binary, or multi-class classifier, a linear or non-linear classifier, and so forth. In one example, the MLA may incorporate an exponential smoothing algorithm (such as double exponential smoothing, triple exponential smoothing, e.g., Holt-Winters smoothing, and so forth), reinforcement learning (e.g., using positive and negative examples after deployment as a MLM), and so forth. It should be noted that various other types of MLAs and/or MLMs may be implemented in examples of the present disclosure, such as k-means clustering and/or k-nearest neighbor (KNN) predictive models, support vector machine (SVM)-based classifiers, e.g., a binary classifier and/or a linear binary classifier, a multi-class classifier, a kernel-based SVM, etc., a distance-based classifier, e.g., a Euclidean distance-based classifier, or the like, and so on. In one example, the signature may include those features which are determined to be the most distinguishing features of the action, e.g., those features which are quantitatively the most different from what is considered statistically normal or average from visual content associated with a given participant, a group of participants, a given context, and/or in general, e.g., the top 20 features, the top 50 features, etc.

In one example, an action detection model, or "signature" may be created that represents multiple detected actions having a threshold similarity. In other words, the multiple detected actions are considered to be unique occurrences of a same action, or a same type of action. For instance, the action signature may comprise a machine learning model (MLM) that is trained based upon the plurality of features from a plurality of the same and/or similar events. For example, each of the similar events may comprise a set of features used as a positive example that is applied to a machine learning algorithm (MLA) to generate the action signature (e.g., a MLM). In one example, the positive examples used to train the MLM may be determined to be "similar" in accordance with an unsupervised, supervised, and/or semi-supervised clustering algorithm. In one example, the event detection model may be represented as an MLM comprising the average features of a cluster of the plurality of similar events in a feature space, a cluster centroid, or the like.

In one example, if an action becomes frequently observed and results in negative experiences for one or more users, the action can be identified as a negative action. To illustrate, a three finger gesture may have negative meaning in certain cultures, but not in other cultures. The processing system may detect occurrences of this action identified from similar patterns in segments of the visual content, cluster these occurrences and the features thereof, and create an action detection model comprising these features. The processing system may also receive inputs from users associated with these visual content segments and learn that this type of action has a negative effect on such users. Namely, some users may find such gesture offensive while others may not.

Moving forward, the processing system may then detect occurrences of the action in visual content, and block or otherwise address the occurrences in accordance with the preferences of one or more users. For instance, in one example, the action detection model (e.g., a MLM) may be applied to process outbound and/or inbound visual content and to identify patterns in the features of the visual content that match the action detection model/signature. In one example, a match may be determined using any of the visual features and/or other features mentioned above. For instance, a match may be determined when there is a threshold measure of similarity among the features of the visual content and the action detection model. In one example, the threshold measure of similarity may alternatively or additionally include matching additional features associated with measurements from wearable devices and/or other sensors. In one example, the features from the visual content and/or additional features may be analyzed using a time-based sliding window. Thus, the next time there is a similar sequence of events, e.g., similar imagery and/or movements as recorded by wearable devices and/or other sensors, it may be associated with the action type and may be identified as a potential additional occurrence of the same action.

When an additional occurrence of the action is detected, all or a portion of a visual representation of a participant performing the offensive action may be blocked, a portion of the visual representation of the participant performing the offensive action may be modified (e.g., blurred, replaced, or substituted), and so on. In one example, objectionable actions may be addressed in both outbound and inbound directions at a user's communication system or in a network-based processing system. For instance, the objectionable action may be addressed at the offending user's communication system (e.g., by blocking, replacing, obfuscating, etc.) and/or with the same or similar remedial measures at the recipient's communication system. In one example, outbound filtering at the offending participant's communication system may be in accordance with the offending participant's own set of configuration settings identifying actions that are considered objectionable by the participant. For example, the participant may utilize the visual communication session for work or professional purposes and may wish to self-censor certain actions that the participant may inadvertently perform, but which the participant would prefer that others not see.

The types of remediation may be selected by default or may be user-specified. For instance, a participant may flag an action as offensive and may provide additional input that subsequent occurrences of the action should be blocked from visual content (e.g., inbound and/or outbound). However, if the participant flags the action as objectionable but does not specify how to address future occurrences of the action, the processing system may implement a default response such as blurring out the pertinent action in the visual content.

Examples of the present disclosure improve social interactions by automated and preemptive filtering of offensive actions instead of manual annotation and faulty auditing. Examples of the present disclosure also prevent spoofing/anonymization to avoid detection. Although examples of the present disclosure primarily provide automated detection and remediation of offensive actions, in one example, the present disclosure may further include a dashboard for a moderator of a multiplayer video game (e.g., a VR game) or other visual communication services, where the dashboard provides a view of offensive actions along with manually selectable options to moderate accordingly for the various experiences and products under the moderator's purview.

In one example, a participant may be enrolled for objectionable action filtering and a profile created for the participant. The profile can initially be bootstrapped from an existing sample profile (e.g., an employer-provided profile, an age-based or other demographic-based profiles, etc.) or entered/customized by the participant during setup. In one example, the processing system may collect interaction data pertaining to interactions of the participant (visual communication sessions, traditional voice calls, text/Short Message Service (SMS) messages, emails, and so forth). The processing system may then populate the participant's profile with actions that are typical/atypical, offensive/non-offensive, etc., with respect to the participant's social circle. Similarly, in one example, the processing system may assign a participant to a category based upon the participant's other network usage, such as online purchases made or shopping items viewed, websites visited, and so forth, and may then assign a profile to the participant based upon the participant's categorization. Alternatively, or in addition, the processing system may continue to monitor network usage data for the participant and update the categorization and associated profile for the participant if and when such categorization changes. For instance, the participant may have a change in habits which may correspond to a generally more restrictive or permissive level of offense that can be adapted to by the processing system. In one example, the processing system may not monitor the participant's network usage, but may periodically subscribe to a service to receive categorization updates for the participant and assign a profile matching the current categorization. In one example, the participant can provide additional examples of accept/reject criterion for the processing system to learn (e.g., prior to the participant actually engaging in visual communication sessions supported by the processing system).

In one example, the processing system learns new actions for detection and classification through participant-labeled examples. For example, an offensive action (e.g., one that is actually offensive to a participant, one that is questionable and which the participant believes may be offensive to others, etc.) may be signaled as such by an input from the participant. For instance, the participant may provide an input to the processing system via a keyboard or mouse, via a voice command, using a gesture captured via a wearable computing device, and so on. In one example, a participant may signal an action to be positive, negative, or neutral.

For a negative/objectionable flagged action, the processing system may label the action, and create and activate an action detection model (e.g., a MLM) for detecting subsequent occurrences of the action. In one example, learning of an action detection model for a new action can be specific to a particular participant, can include multiple participants of a given social group or other segments of participants, or can be platform-wide. For instance, multiple user labels for the same and/or similar actions may be pooled, creating a larger aggregate (and more diverse) event detection model that may reduce false alarms from a single-person input. Alternatively, or in addition, learning of an event detection model for a new action can include developing a "lite" version on a local client (e.g., a given participant's communication system) and then comprehensive tuning of the event detection model may be performed with respect to inputs from a plurality of participants regarding various segments of visual content. In addition, in one example participants' labels for actions can be weighted based upon the participants' respective experience with the visual communication service (e.g., number of years as a participant, number of visual communication sessions, time spent on the platform, etc.), based upon the participants' respective reputation scores, and so forth. In one example, event detection models (whether specific to a participant, or associated with and/or used by a group of participants) may be updated to account for new data and may be redeployed as updated versions.

In one example, a moderator may be contacted by the participant or automatically notified by the processing system to review recent borderline activities and to apply human judgement for labeling. For instance, the processing system may identify trending (or instantaneous) anomalous actions that are labeled as negative or questionable for view by the moderator via a user interface. Similarly, in one example, the processing system may display new trends of actions for participants to discover new actions that may be offensive, new actions which the participants may be interested to learn to keep up with cutting-edge socio-cultural progression, and so on.

In one example, the processing system may send a notification to an offending participant when his or her action is detected as an offensive action by the processing system (and/or when remediated). In one example, instead of or in parallel to blocking or otherwise addressing a detected offensive action, the processing system may provide guidance for a participant regarding appropriate and inappropriate actions with respect to a current context. For example, the processing system may recommend that a participant performs an example positive action that may be calculated to be warranted in a currently detected context. For instance, the participant may be engaged in a visual communication session with others who have particularly indicated that a given action is considered to be a "positive" action. In one example, a participant may include a bot or automated agent acting on behalf of a person or organization. As such, in one example, feedback from the processing system as to positive, negative, or neutral actions may be used to train the bot/agent in accordance with one or more machine learning model(s) defining the agent/bot.

In one example, the processing system may alternatively or additionally notify a receiver (or sender) of a potential remediation and ask for consent/authorization to override or to select a non-default remediation option for the action, e.g., altering the visual representation of the action to appear differently, rather than simply blocking the action from the video content. In another example, the processing system may recommend interactions between participants based on similar profiles, similar flagging of actions as offensive, and so forth. In still another example, if action detection models are running locally on a participant's communication system, these models may be transferred to another device or system comprising a plurality of devices. In one example, preemptive remediation is expedited by manual flagging by a participant. However, in one example, the processing system may also learn negative actions from observing a participant's behavior, reaction, and/or mood after an action (either as the performer of the action, or as a recipient of visual content from another that includes the actions). Thus, consistent patterns that adversely affect participants and their experiences are also gradually detected and may be filtered, even without explicit participant feedback.

In one example, the processing system may maintain scores (likelihood) for actions for various participants (e.g., participant 1 is "likely" to perform action X, participant 2 is "highly unlikely" to perform action X, and so forth). In one example, the processing system may selectively maintain different event detection filters as active. For instance, it may be overwhelming to the processing system to simultaneously maintain active action detection models for various actions for one or more participants. However, certain actions may be deemed more or less likely to be detected based upon the identities of the participants and their respective scores with regard to various actions. Thus, those actions which are deemed offensive by one or more participants and which are more likely to occur (based upon the scores of one or more participants) may be selected to be active. As just one example, a participant may be particularly prone to engaging in a given offensive action and the participant may have included this action for outbound filtering (self-censoring). The processing system may learn the participant's proclivity for this particular action based upon detecting the same action being performed by the participant in other visual communication sessions. Thus, the processing system may ensure that the action detection model for this action is active because the user is more likely to engage in this particular offensive action as compared to other offensive actions that the participant wants to be filtered, but that the participant is less likely to engage in. These and other aspects of the present disclosure are described in greater detail below in connection with the examples of FIGS. 1-3.

To further aid in understanding the present disclosure, FIG. 1 illustrates an example system 100 in which examples of the present disclosure for detecting and modifying actions of visual representations of users in visual content may operate. The system 100 may include any one or more types of communication networks, such as a traditional circuit switched network (e.g., a public switched telephone network (PSTN)) or a packet network such as an Internet Protocol (IP) network (e.g., an IP Multimedia Subsystem (IMS) network), an asynchronous transfer mode (ATM) network, a wireless network, a cellular network (e.g., in accordance with 3G, 4G/long term evolution (LTE), 5G, etc.), and the like related to the current disclosure. It should be noted that an IP network is broadly defined as a network that uses Internet Protocol to exchange data packets. Additional example IP networks include Voice over IP (VoIP) networks, Service over IP (SoIP) networks, and the like.

In one example, the system 100 may comprise a network 102, e.g., a telecommunication service provider network, a core network, an enterprise network comprising infrastructure for computing and communications services of a business, an educational institution, a governmental service, or other enterprises. The network 102 may be in communication with one or more access networks 120 and 122, and the Internet (not shown). In one example, network 102 may combine core network components of a cellular network with components of a triple play service network; where triple-play services include telephone services, Internet services and television services to subscribers. For example, network 102 may functionally comprise a fixed mobile convergence (FMC) network, e.g., an IP Multimedia Subsystem (IMS) network. In addition, network 102 may functionally comprise a telephony network, e.g., an Internet Protocol/Multi-Protocol Label Switching (IP/MPLS) backbone network utilizing Session Initiation Protocol (SIP) for circuit-switched and Voice over Internet Protocol (VoIP) telephony services. Network 102 may further comprise a broadcast television network, e.g., a traditional cable provider network or an Internet Protocol Television (IPTV) network, as well as an Internet Service Provider (ISP) network. In one example, network 102 may include a plurality of television (TV) servers (e.g., a broadcast server, a cable head-end), a plurality of content servers, an advertising server (AS), an interactive TV/video on demand (VoD) server, and so forth.

Figure 3:
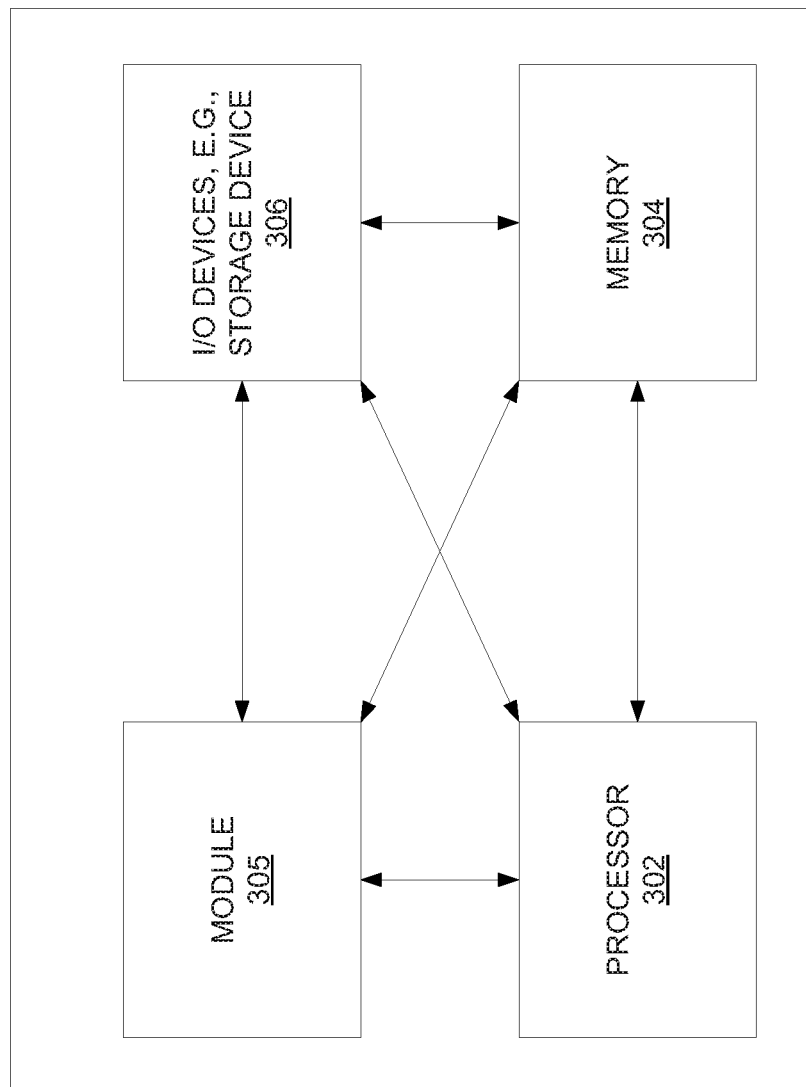
FIG. 3 illustrates a high level block diagram of a computing device specifically programmed to perform the steps, functions, blocks and/or operations described herein.

In accordance with the present disclosure, application server (AS) 104 may comprise a computing system or server, such as computing system 300 depicted in FIG. 3, and may be configured to provide one or more operations or functions for detecting and modifying actions of visual representations of users in visual content, as described herein. It should be noted that as used herein, the terms "configure," and "reconfigure" may refer to programming or loading a processing system with computer-readable/computer-executable instructions, code, and/or programs, e.g., in a distributed or non-distributed memory, which when executed by a processor, or processors, of the processing system within a same device or within distributed devices, may cause the processing system to perform various functions. Such terms may also encompass providing variables, data values, tables, objects, or other data structures or the like which may cause a processing system executing computer-readable instructions, code, and/or programs to function differently depending upon the values of the variables or other data structures that are provided. As referred to herein a "processing system" may comprise a computing device including one or more processors, or cores (e.g., as illustrated in FIG. 3 and discussed below) or multiple computing devices collectively configured to perform various steps, functions, and/or operations in accordance with the present disclosure.

Thus, although only a single application server (AS) 104 is illustrated, it should be noted that any number of servers may be deployed, and which may operate in a distributed and/or coordinated manner as a processing system to perform operations for detecting and modifying actions of visual representations of users in visual content, in accordance with the present disclosure. In one example, AS 104 may comprise a physical storage device (e.g., a database server), to store various types of information in support of systems for detecting and modifying actions of visual representations of users in visual content, in accordance with the present disclosure. For example, AS 104 may store one or more configuration settings for various users, households, employers, service providers, and so forth that may be processed by AS 104 in connection with establishing visual communication sessions, or that may be provided to devices establishing visual communication sessions via AS 104. AS 104 may further create and/or store action detection models which may be utilized by users, households, employers, service providers, and so forth in connection with such configuration settings. For ease of illustration, various additional elements of network 102 are omitted from FIG. 1.

In one example, the access networks 120 and 122 may comprise Digital Subscriber Line (DSL) networks, public switched telephone network (PSTN) access networks, broadband cable access networks, Local Area Networks (LANs), wireless access networks (e.g., an IEEE 802.11/ Wi-Fi network and the like), cellular access networks, $3^{rd}$ party networks, and the like. For example, the operator of network 102 may provide a cable television service, an IPTV service, or any other types of telecommunication service to subscribers via access networks 120 and 122. In one example, the access networks 120 and 122 may comprise different types of access networks, may comprise the same type of access network, or some access networks may be the same type of access network and others may be different types of access networks. In one example, the network 102 may be operated by a telecommunication network service provider. The network 102 and the access networks 120 and 122 may be operated by different service providers, the same service provider or a combination thereof, or may be operated by entities having core businesses that are not related to telecommunications services, e.g., corporate, governmental or educational institution LANs, and the like.

In one example, the access network 120 may be in communication with a device 131. Similarly, access network 122 may be in communication with one or more devices, e.g., device 141. Access networks 120 and 122 may transmit and receive communications between devices 131 and 141, between devices 131 and 141, and application server (AS) 104, other components of network 102, devices reachable via the Internet in general, and so forth. In one example, each of devices 131 and 141 may comprise any single device or combination of devices that may comprise a user endpoint device. For example, the devices 131 and 141 may each comprise a mobile device, a cellular smart phone, a wearable computing device (e.g., smart glasses) a laptop, a tablet computer, a desktop computer, an application server, a bank or cluster of such devices, and the like. In one example, devices 131 and 141 may each comprise programs, logic or instructions for performing functions in connection with examples of the present disclosure for detecting and modifying actions of visual representations of users in visual content. For example, devices 131 and 141 may each comprise a computing system or device, such as computing system 300 depicted in FIG. 3, and may be configured to provide one or more operations or functions in connection with examples of the present disclosure for detecting and modifying actions of visual representations of users in visual content, as described herein.

In one example, the device 131 is associated with a first user (user 1) 191 at a first physical environment 130. As illustrated in FIG. 1, the device 131 may comprise a wearable computing device (e.g., smart glasses) and may provide a user interface 135 for user 191. For instance, device 131 may comprise smart glasses with augmented reality (AR) enhancement capabilities. For example, endpoint device 131 may have a screen and a reflector to project outlining, highlighting, or other visual markers to the eye(s) of user 191 to be perceived in conjunction with the surroundings. In the present example, device 131 may provide three windows 137-139 in the user interface 135. Also associated with user 191 and/or first physical environment 130 is a camera 132 which may be facing user 191 and which may capture a video comprising the first physical environment 130, including user 191 and other items or objects therein, such as sticks A and B. In one example, camera 132 may communicate with device 131 wirelessly, e.g., to provide a video stream of the first physical environment 130. As an alternative, or in addition, in one example, device 131 may also comprise an outward facing camera to capture video of the first physical environment 130 from a field of view in a direction that user 191 is looking.

In one example, the device 131 may present visual content of one or more other users via user interface 135 (e.g., presented as a plurality of windows 137-139 in FIG. 1). In one example, the physical environment 130 and user interface 135 may comprise an augmented reality (AR) or a mixed reality (MR) environment, e.g., when the physical environment 130 remains visible to user 191 when using device 131, and the visual content received from one or more other users is presented spatially in an intelligent manner with respect to the physical environment 130. In another example, the user interface 135 may comprise a virtual reality (VR) environment for the user 191. In one example, the components associated with user 191 and/or first physical environment 130 that are used to establish and support a visual communication session may be referred to as a "communication system." For instance, a communication system may comprise device 131, or device 131 in conjunction with camera 132, device 131 in conjunction with a smartphone or personal computer, a wireless router, or the like supporting visual communication sessions of device 131, and so on.

Similarly, device 141 may be associated with a second user (user 2) 192 and a third user (user 3) at a second physical environment 140. As illustrated in FIG. 1, the device 141 may comprise a personal computer, desktop computer, or the like, and may provide a user interface 145 for users 192 and 193 via a plurality of display screens 147-149. The user interface 145 may be similar to user interface 135, but may be provided with physical display screens 147-149 instead of projections of windows 137-139. Also associated with users 192 and 193, and/or second physical environment 140, is a camera 142 which may be facing users 192 and 193 and which may capture a video comprising the second physical environment 140, including users 192 and 193 and other items or objects therein. In one example, camera 142 may be coupled to device 141 and may provide a video stream of the second physical environment 140. As illustrated in FIG. 1, user 193 may also have wearable devices/sensors 143 and 144 which may measure, record, and/or transmit data related to movement and position, such as locations, orientations, accelerations, and so forth. For instance, wearable devices/sensors 143 and 144 may each include a Global Positioning System (GPS) units, a gyroscope, a compass, one or more accelerometers, and so forth. In one example, wearable devices/sensors 143 and 144 may also measure, record, and/or transmit biometric data, such as a heart rate, a skin conductance, and so on. In one example, wearable devices/sensors 143 and 144 may include transceivers for wireless communications, e.g., for Institute for Electrical and Electronics Engineers (IEEE) 802.11 based communications (e.g., "Wi-Fi"), IEEE 802.15 based communications (e.g., "Bluetooth", "ZigBee", etc.), cellular communication (e.g., 3G, 4G/LTE, 5G, etc.), and so forth. As such, wearable devices/sensors 143 and 144 may provide various measurements to device 141 and/or to AS 104 (e.g., via device 141 and/or via access network 122).

In one example, devices 131 and 141 may communicate with each other and/or with AS 104 to establish, maintain/operate, and/or tear-down a visual communication session. In one example, AS 104 and device 131 and/or device 141 may operate in a distributed and/or coordinated manner to perform various steps, functions, and/or operations described herein. To illustrate, AS 104 may establish and maintain visual communication sessions for various users and may store and implement one or more configuration settings specifying both inbound and outbound modifications of visual content from the various users. The visual content may comprise video content, which may include visual imagery of a physical environment (e.g., including imagery of one or more users), and which in some cases may further include recorded audio of the physical environment. In one example, the visual content may also include virtual reality (VR) and/or augmented reality (AR) (also referred to as mixed reality (MR)) visual content, such as images of artificial scenery, background, or objects, avatars representing various users, and so forth. For instance, AS 104 may maintain for a virtual world for a massive multi-player online game (MMOG, e.g., a type of "visual communication session"), or the like.

As used herein, the term AR environment or virtual environment, refers to a set of images or sounds that are generated by devices and systems of the present disclosure and that are presented to users, e.g., exclusively via an immersive headset and/or earphone or as a supplement to images and sounds that are generated outside of the devices and systems of the present disclosure, i.e., in the "real-world." Thus, the terms augmented reality (AR) environment and virtual environment may be used herein to refer to the entire environment experienced by a user, including real-world images and sounds combined with images and sounds of the AR environment/virtual environment. The images and sounds of an AR environment may be referred to as "virtual objects" and may be presented to users via devices and systems of the present disclosure. While the real world may include other machine generated images and sounds, e.g., animated billboards, music played over loudspeakers, and so forth, these images and sounds are considered part of the "real-world," in addition to natural sounds and sights such as waves crashing on a beach, the sound of wind through the trees and the corresponding image of waving tree branches, the sights and sounds of wildlife, and so on.

With respect to an avatar representing a user, the avatar may be controlled by the user and move within a virtual environment using any number of forms of input, such as voice commands, a keyboard, a mouse, a joystick, or the like. Alternatively, or in addition, the avatar may be controlled via one or more wearable devices of the user. For instance, the avatar may be made to move within the virtual environment in accordance with movements of the user's body as detected via the one or more wearable devices. It should be noted that the presentation of the avatar of the user for other users participating in the visual communication session may have a fixed relationship to the physical world, e.g., a 1:1 ratio of movement/position, may be scaled, e.g., a 4:1 ratio of movement position, or may have an arbitrary relationship with regard to one or more dimensions or other parameters.

In one example, AS 104 may receive a request to establish a visual communication session from device 131 and/or device 141. The visual communication session may be established for such devices after AS 104 retrieves one or more configuration settings for the user 191, user 192, and/or user 193, determines which configuration setting(s), if any, to apply based upon the context(s), and activates the respective action detection models and/or configuration setting(s) which are determined to apply to the context(s). The request may be received via access network 120, access network 122, network 102, and/or the Internet in general, and the visual communication session may be provided via any one or more of the same networks.

The establishment of the visual communication session may include providing security keys, tokens, certificates, or the like to encrypt and to protect the media streams between devices 131 and 141 when in transit via one or more network and to allow devices 131 and 141 to decrypt and present received video content and/or received user interface content via user interfaces 135 and 145, respectively. In one example, the establishment of the visual communication session may further include reserving network resources of one or more networks (e.g., network 102, access networks 120 and 122, etc.) to support a particular quality of service (QoS) for the visual communication session (e.g., a certain video resolution, a certain delay measure, and/or a certain packet loss ratio, and so forth). Such reservation of resources may include an assignment of slots in priority queues of one or more routers, the use of a particular QoS flag in packet headers which may indicate that packets should be routed with a particular priority level, the establishment and/or use of a certain label-switched path with a guaranteed latency measure for packets of the visual communication session, and so forth.

In one example, AS 104 may establish a communication path such that media streams between device 131 and device 141 pass via AS 104, thereby allowing AS 104 to implement modifications to the visual content in accordance with the applicable configuration setting(s). The one or more configuration settings may be user-specified, may be based upon the capabilities of devices of user 191 and/or user 192 being used for the visual communication session, may be provided by an employer or sponsor of a visual communication session service of network 102 and/or AS 104, may be provided by an operator of network 102 or the system 100 in general, and so forth. As just one example, device 131 may provide information regarding the capabilities and capacities of device 131 and camera 132 to AS 104 in connection with a request to establish a visual communication session with device 141. AS 104 may send a notification of the request to device 141. Similarly, device 141 may provide information regarding the capabilities and capacities of device 141 and camera 142 to AS 104 in connection with a response to the request/notification to establish the visual communication session.

In one example, a visual communication session may be established between two or more users, and one or more additional users may request to join, and be joined to the visual communication session in the same or a similar manner. Thus, as illustrated in FIG. 1, a visual communication session including users 191, 192, and 193, may further include a fourth user ("user 4") represented as an avatar of a bird 181, and a fifth user ("user 5") represented as a human-like avatar 183 in FIG. 1. The visual communication session may be a video call, a group video call, a short or long-lived AR or VR session, e.g., established privately among the users via AS 104 and/or the users' respective communication systems, or hosted by AS 104 for public or semi-public usage, e.g., a MMOG.

In one example, device 131 and/or device 141 may indicate a purpose for the visual communication session (e.g., further context) such as a work collaboration session, a client call, a personal call, etc. In this regard, the user 191 may have previously provided to AS 104 one or more configuration settings to match to different types of visual communication sessions (e.g., different contexts). In one example, AS 104 may determine that a configuration setting of user 191 is applicable in the context(s) of the current visual communication session. The context(s) may include, the purpose of the visual communication session, the time of the visual communication session, the parties to the visual communication session, biometric data of one or more parties to the visual communication session, mood data regarding one or more parties to the visual communication session, and so forth.

In one example, the system 100 supports the creation of action detection models and associated one or more configuration settings. For example, the configuration settings may map actions and action detection models with applicable contexts to activate the action detection models and corresponding modifications to visual content to implement when respective actions are detected. The action detection models and the one or more configuration settings can be created by and/or for a single user for application to visual communication sessions of that user, can be created for a group of users, can be created by the system and made available for selection by users to activate (e.g., model profiles and/or default configuration settings), and so on.

To illustrate, in the example of FIG. 1, user 191 may have previously performed an action involving waving two sticks up and down simultaneously that the user 191 considered to be offensive. User 191 may also have determine that he or she would not like other participants to see this particular action in future visual communication sessions. As such, the user 191 may have provided an input (e.g., to AS 104) with regard to previous visual content earlier in the visual communication session, or in one or more earlier communication sessions, to indicate that the action, or this type of action, was offensive and should be edited in the future. AS 104 may create an action detection model for the action, e.g., extract features from the visual content which distinguish the action from "normal" visual content and/or content which does not include the action, and then activate the action detection model as a filter for future instances of the action. In addition, AS 104 may create a configuration setting for the user 191 to define a corresponding modification to visual content that should be made when additional occurrences of this particular action are detected via the action detection model/filter, e.g., block, obfuscate, replace, etc.

Returning to the illustration of FIG. 1, it can be seen that user 191 is engaging in the action of simultaneously waving two sticks A and B. This imagery of user 191 may be captured as visual content by camera 132 and forwarded to AS 104 via device 131. In the present example, AS 104 may apply the action detection model to the visual content, determine that it contains an instance of the action, and may then edit the action in the visual content in accordance with the one or more configuration settings of user 191. For instance, the user 191 may have indicated to AS 104 to replace instances of the action with non-movement. In this case, AS 104 may replace imagery of movement of stick A with a non-moving representation. In addition, AS 104 may then forward the visual content that has been modified/edited to other participants of the visual communication session. For instance, device 141 may receive the modified visual content from AS 104 and present the modified visual content via display screen 147. As illustrated in FIG. 1, in display screen 147 user 1 appears to be only moving stick B, but stick A is not moving. Thus, the presentation of the offensive gesture of user 191 has been prevented in accordance with the wishes of user 191 (e.g., as recorded in the one or more configuration settings of user 191).

Similarly, the one or more configuration settings of user 191 may further include an action detection model for inbound filtering of an action involving users simultaneously moving their arms in an in-and-out manner. Thus, for example, camera 142 may capture imagery of users 192 and 193 (e.g., visual content) which includes user 193 making such a motion. The camera may forward the visual content to AS 104 via device 141. AS 104 may then apply the action detection model and determine that the visual content includes the offensive action. AS 104 may then also modify the visual content in accordance with the configuration setting of user 191. For instance, user 191 may have indicated that such an action should result in blocking of the associated visual imagery of a user performing the offensive action. In this case, AS 104 may edit/modify the visual content to block imagery of user 193 performing the action and forward the modified visual content to device 131 for presentation to user 191. As illustrated in FIG. 1, device 131 may present the modified visual content via window 137, which includes imagery of user 192, but user 193 is omitted from the visual content using block 182. Notably, the same visual imagery may also be transmitted by AS 104 to communication systems of users 4 and 5, respectively. However, if these users are not offended by the action of simultaneously moving arms in an in-and-out manner and do not have action detection models activated to detect and filter such an action, then users 4 and 5 may see an unmodified version of the visual content from camera 142 (or versions that are at least not modified in accordance with the configuration settings for user 191).

It should be noted that in one example, the offensive action of user 193 may alternatively or additionally be detected via data from wearable devices 143 and 144. For example, readings from wearable devices 143 and 144 may indicate the motion of the arms of user 193. In addition, the action detection model may include features relating to wearable device/sensor measurements which can be compared to the readings from wearable devices 143 and 144 to determine a match to the action. Thus, in one example, AS 104 may obtain the measurements from devices 143 and 144, via device 141 and/or access network 122, and apply the action detection model to the measurements (e.g., as an alternative or in addition to the visual content from camera 142).

The foregoing describes an example of network-based application of one or more configuration settings by AS 104. However, it should be understood that in other, further, and different examples, the application of one or more configuration settings and the modifications of visual content in accordance with the configuration settings may alternatively or additionally be applied locally, e.g., at device 131 and/or at device 141. It should also be noted that the foregoing describes examples of visual content filtering in accordance with users' configuration settings, e.g., applying action detection models, detecting occurrences of actions, modifying visual content, etc. However, in one example, additional filters and/or configuration settings may be applied for users' outbound and inbound visual content as directed by employers, head of household/account holders (e.g., for users who are children), and so forth. For instance, AS 104 may store a catalog of action detection models and/or configuration settings that may be selected for application to visual communication sessions of various user and for various contexts. For instance, AS 104 may have a plurality of available machine learning algorithms or for detecting specific potentially offensive actions and/or a plurality of configuration settings associated with model profiles or default profiles (e.g., sensitive, somewhat sensitive, non-sensitive, etc., model profiles associated with particular cultures or situations, and so forth). In one example, a default profile may have a plurality of action detection models to be applied, while a user selecting the default profile may still specify the type of modifications to apply in response to a detections of occurrences of the respective associated actions. Accordingly, users, employers, service providers, network operators, etc. may select various configuration settings from such a catalog to be applied by AS 104 and/or for download and application locally by the user devices and/or communication systems. In still another example, users or others with an interest and/or permission to apply configuration settings may also provide sample actions which may be captured via video and/or wearable device/sensor measurements from which an action detection model may be generated. Thus, certain actions may be preempted without first having to experience the action in an interactive communication session with other users. Thus, these and other modifications are all contemplated within the scope of the present disclosure.

It should also be noted that the system 100 has been simplified. Thus, it should be noted that the system 100 may be implemented in a different form than that which is illustrated in FIG. 1, or may be expanded by including additional endpoint devices, access networks, network elements, application servers, etc. without altering the scope of the present disclosure. In addition, system 100 may be altered to omit various elements, substitute elements for devices that perform the same or similar functions, combine elements that are illustrated as separate devices, and/or implement network elements as functions that are spread across several devices that operate collectively as the respective network elements. For example, the system 100 may include other network elements (not shown) such as border elements, routers, switches, policy servers, security devices, gateways, a content distribution network (CDN) and the like. For example, portions of network 102, access networks 120 and 122, and/or Internet may comprise a content distribution network (CDN) having ingest servers, edge servers, and the like for packet-based streaming of video, audio, or other content. Similarly, although only two access networks, 120 and 122 are shown, in other examples, access networks 120 and/or 122 may each comprise a plurality of different access networks that may interface with network 102 independently or in a chained manner.

In one example, the system 100 may further include wireless or wired connections to sensors, such as temperature sensors, door sensors, light sensors, movement sensors, etc., to automated devices, such as aerial or vehicular drones (e.g., equipped with global positioning system (GPS) receivers, cameras, microphones, wireless transceivers, and so forth, and which my capture video content of a physical environment), to devices of other users and/or non-participants, and so forth. In another example, device 131 may maintain a first configuration setting when a visual communication session is established. However, a door sensor may communicate with device 131 to indicate that a door has been opened (e.g., to a house of user 191). This may indicate that other individuals may now be imminently present and that at least a second configuration setting should be applicable/activated, e.g., to apply more stringent filtering by activating more action detection models and configuration settings for removing/altering visual content, and so on. Thus, these and other modifications are all contemplated within the scope of the present disclosure.

Figure 2:
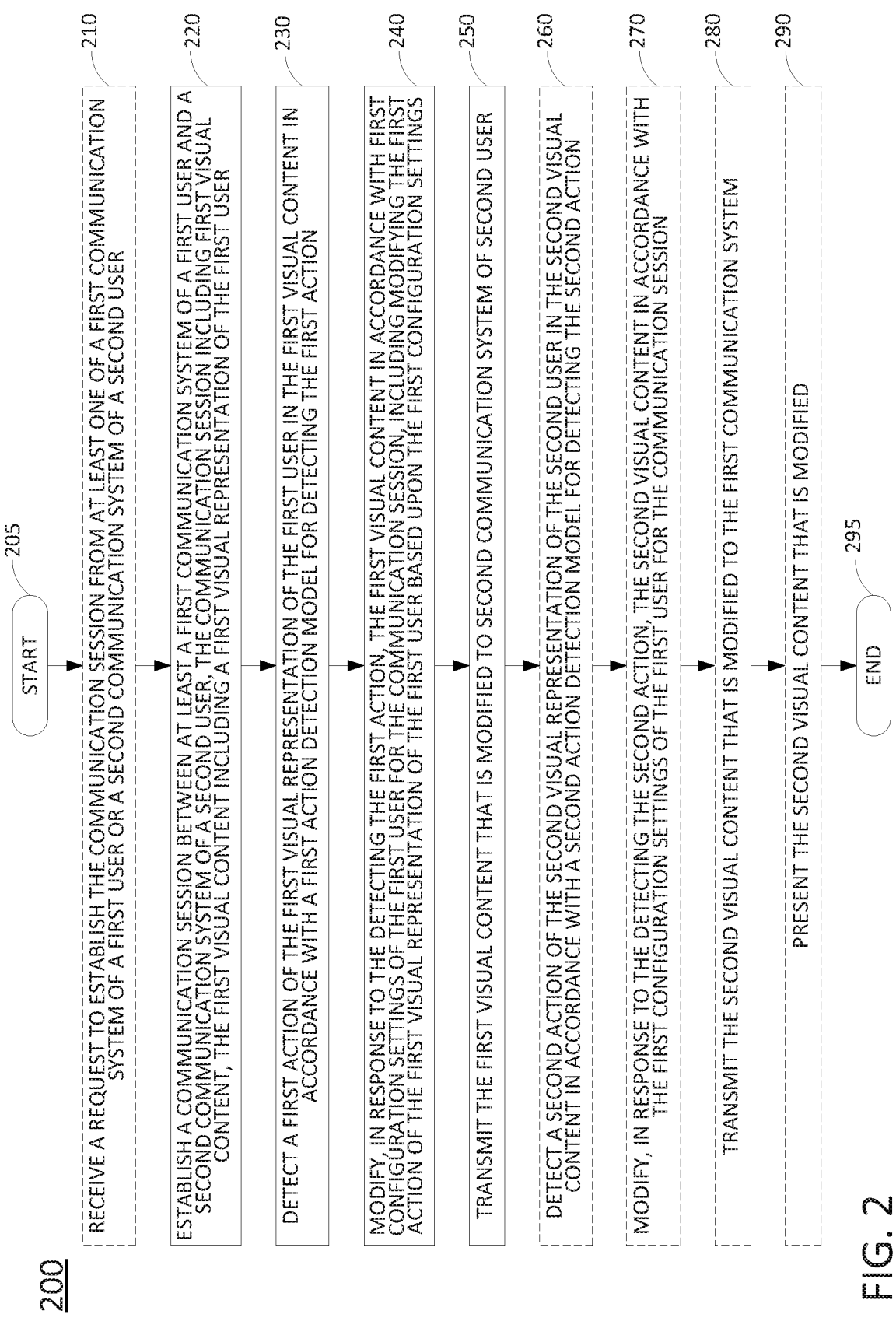
FIG. 2 illustrates a flowchart of an example method for detecting and modifying actions of visual representations of users in visual content.

FIG. 2 illustrates a flowchart of an example method 200 for detecting and modifying actions of visual representations of users in visual content, in accordance with the present disclosure. In one example, the method 200 is performed by a component of the system 100 of FIG. 1, such as by application server 104, device 131, or device 141, and/or any one or more components thereof (e.g., a processor, or processors, performing operations stored in and loaded from a memory), or by application server 104, in conjunction with one or more other devices, such as device 131, device 141, and so forth. In one example, the steps, functions, or operations of method 200 may be performed by a computing device or system 300, and/or processor 302 as described in connection with FIG. 3 below. For instance, the computing device or system 300 may represent any one or more components of application server 104, device 131, or device 141 in FIG. 1 that is/are configured to perform the steps, functions and/or operations of the method 200. Similarly, in one example, the steps, functions, or operations of method 200 may be performed by a processing system comprising one or more computing devices collectively configured to perform various steps, functions, and/or operations of the method 200. For instance, multiple instances of the computing device or processing system 300 may collectively function as a processing system. For illustrative purposes, the method 200 is described in greater detail below in connection with an example performed by a processing system. The method 200 begins in step 205 and proceeds to step 210.

At optional step 210, the processing system may receive a request to establish a communication session (e.g., a visual communication session) from at least one of a first communication system of a first user or a second communication system of a second user. The processing system may include at least one processor deployed in the first physical environment and/or at least one processor deployed in a communication network. The processing system may alternatively or additionally comprise the first communication system of the first user, the second communication system of the second user, and/or network-based components. The communication session may be for a video call, a group video call, an AR or VR session, a MMOG, or the like.

At step 220, the processing system establishes a communication session between at least a first communication system of a first user and a second communication system of a second user, the communication session including first visual content, the first visual content including a first visual representation of the first user. The first visual representation of the first user may comprise a video image of the first user or an animated avatar (human-like or non-human-like) associated with the first user. In one example, the first visual content is generated via the first communication system. In one example, the communication session includes second visual content, the second visual content including a second visual representation of the second user. For instance, the second visual content may be generated via the second communication system of the second user.

It should also be noted that although the terms, "first," "second," "third," etc., are used herein, the use of these terms are intended as labels only. Thus, the use of a term such as "third" in one example does not necessarily imply that the example must in every case include a "first" and/or a "second" of a similar item. In other words, the use of the terms "first," "second," "third," and "fourth," do not imply a particular number of those items corresponding to those numerical values. In addition, the use of the term "third" for example, does not imply a specific sequence or temporal relationship with respect to a "first" and/or a "second" of a particular type of item, unless otherwise indicated.

At step 230, the processing system detects a first action of the first visual representation of the first user in the first visual content in accordance with a first action detection model for detecting the first action. For example, the first action may comprise a gesture or other potentially offensive actions. In one example, the first action detection model comprises a machine learning model (MLM) for detecting the first action, wherein the MLM is trained based upon at least one input of the first user regarding at least one segment of visual content including at least one visual representation of at least one user. The MLM may identify, from the at least one segment, features of the at least one visual representation of the at least one user that distinguish the first action from visual content that does not contain the first action. In one example, the features are from a feature space comprising quantified aspects of the visual content. Quantified aspects may include low-level invariant image data, features relating to movement in a video, e.g., changes within images and between images, recognized objects (e.g., including parts of a human body such as legs, arms, hands, etc.), a length to width ratio of an object, a velocity of an object estimated from a sequence of images (e.g., video frames), and so forth. In one example, features may additionally be taken from wearable device inputs such as gyroscope and compass measurements from various points of a human body, eye movements, and so forth.

The first action detection model/MLM can be trained from input of other users regarding actions by various other users. In one example, the first user may borrow one of several standard profiles which may include the first action detection model. In one example, the first action detection model may be activated by the processing system for detection and remediation of an action when more than a threshold number of users identify the same or similar action as being offensive. In one example, the number of users may be users who are also utilizing the same standard profile or profile level, users who self-identify as being a same type of user, users who are participating in a same MMOG, and so forth. For example, a video call can be established between users from different countries with different customs. Thus, standard profiles pertaining to offensive actions from country 1 can be used to filter visual content containing actions of users of country 2 and vice versa, where standard profiles pertaining to offensive actions from country 2 can be used to filter visual content containing actions of users of country 1.

In one example, the processing system may select the first action detection model for active use when one or more context criteria are met. For instance, the processing system may activate the action detection model when the context includes one or more of: a physical location of the first user, a physical location of the second user, a time of day, a presence of other individuals besides the first user and the second user in the communication session, a relationship between the first user and the second user, a type of task for the communication session, a topic of the communication session, and so forth. In one example, the context may be that the first user has provided an input to the processing system indicating that an offensive action was encountered. The processing system may then generate the action detection model/MLM and activate the action detection model when the generating is completed. In one example, the processing system may continue to refine the action detection model/MLM with each occurrence of the action that is detected (such as in accordance with step 240 below). In addition, the processing system may continue to receive input from the first user and/or other users regarding whether detection of an action and a corresponding modification of visual content was appropriately applied. In other words, the processing system utilizes reinforcement learning to utilize new positive examples and/or new negative examples to enhance the action detection model and its classification capability.

At step 240, the processing system modifies, in response to the detecting the first action, the first visual content in accordance with first configuration settings of the first user for the communication session. In particular, the modifying may comprise modifying the first action of the first visual representation of the first user in the first visual content based upon the first configuration settings. For example, the first configuration settings may specify a first modification to be applied to the first action of the first visual representation of the first user in the first visual content (and to other occurrences of the same action/type of action). The first modification may comprise at least one of: blocking at least a portion of the first visual representation of the first user in the first visual content, obfuscating at least a portion of the first visual representation of the first user in the first visual content, removing at least a portion of the first visual representation of the first user in the first visual content, or changing the first action of the first visual representation of the first user in the first visual content to a different action. The modification may be selected by a user, or may be defined in connection with a default or standard profile that may be selected by or for a user, and which may include the particular configuration setting and the associated action detection model.

The first configuration settings (and similarly the first action detection model) may be associated with various contexts. For instance, the first configuration settings may be associated with at least one of: a physical location of the first user, a physical location of the second user, a time of day, a presence of other individuals besides the first user and the second user in the communication session, a relationship between the first user and the second user, a type of task for the communication session, a topic of the communication session, and so forth. For example, if the communication session is indicated to be for sports talk between fans of two teams, the configuration settings may include heightened filtering (e.g., application of additional action detection models and/or more stringent modifications of the visual content) since the first user may be more likely to engage in bad actions that he or she may regret. Alternatively, the configuration settings may be more permissive in terms of filtering, (e.g., lowered standards) since bad gestures may be expected and intended, versus speaking with colleagues or customers relating to work, for example. In one example, different modifications to the first visual content may be indicated for the same action, but for different contexts.

In one example, the first configuration settings may also be selected for application based upon a capability of the first communication system, a capability of the second communication system, a capability of the processing system, or a capability of a network supporting the communication session. For instance, if the processing system is not capable of modifying the first visual representation of the first user in real-time (e.g., without perceptible delay, jumps in the visual content, visible artifacts, etc.), the processing system may select to block the first visual representation, which may be simpler and require less time and computing resources than the preferred option of modifying the first visual representation of the first user to show a static image rather than the movement of the offending action.

At step 250, the processing system transmits the first visual content that is modified to the second communication system of the second user. In one example, the second communication system is to display the first visual content that is modified for the second user.

At optional step 260, the processing system may detect a second action of the second visual representation of the second user in the second visual content in accordance with a second action detection model for detecting the second action. In one example, the second action detection model comprises a second machine learning model for detecting the second action. In one example, the second action detection model may be made active in accordance with the first configuration settings of the first user. For instance, the first user may have both inbound and outbound filtering of visual content for the communication session. In one example, the second machine learning model is trained based upon at least one input of a user regarding at least one segment of visual content including at least one visual representation of at least one user. For instance, the processing system may receive inputs by other users who are similar to the first user (e.g., have the same or similar profiles) and may determine that the second action may be an offensive action to the group of similar users. Thus, the second action detection model may be activated for the first user.

At optional step 270, the processing system may modify, in response to the detecting the second action, the second visual content in accordance with the first configuration settings of the first user for the communication session. For instance, optional step 270 may comprise similar operations as described above in connection with step 240.

At optional step 280, the processing system may transmit the second visual content that is modified to the first communication system of the first user. For instance, optional step 280 may be performed in an example where the processing system comprises a network-based processing system.

At optional step 290, the processing system may present the second visual content that is modified. For instance, optional step 290 may be performed when the processing system is the first communication system or includes the first communication system (e.g., further comprising network-based components and/or the second communication system).

Following step 250, or any of the optional steps 260-290, the method 200 proceeds to step 295 where the method ends.

It should be noted that the method 200 may be expanded to include additional steps, or may be modified to replace steps with different steps, to combine steps, to omit steps, to perform steps in a different order, and so forth. For instance, in one example the processor may repeat one or more steps of the method 200, such as steps 220-250 to continue to receive first visual content, to detect the first action, to modify the first visual content, etc. The processor may similarly repeat steps 260-280 and/or 260-290 to continue to receive second visual content, to detect the second action, to modify the second visual content, etc.

In still another example, the method 200 may be expanded to include topic (e.g., theme and/or concept) detection and then selecting configuration settings for the first user and/or the second user in accordance with the topic. For instance, the processing may apply topic models (e.g., classifiers) for a number of topics to the first visual content and/or the second visual content to identify a topic. The topic model classifiers can be trained from any text, video, image, audio and/or other types of content to recognize various topics, which may include objects like "car," scenes like "outdoor," and actions or events like "baseball." Topic identification classifiers may include support vector machine (SVM) based or non-SVM based classifiers, such as neural network based classifiers and may utilize the same or similar features extracted from the first visual content or the second visual content that may be used to identify objects for modification in accordance with first configuration settings and/or second configuration settings. Once a topic is identified, the topic may be further correlated with configuration settings (e.g., including action detection models) for work collaboration, client meeting, family, personal call, etc. For instance, a topic of "baseball" may be mapped to configuration settings for "personal call" rather than "work collaboration." The mapping(s) may be provided by the users, a head of household, an employer, a provider of a visual communication session service, and so forth. Thus, these and other modifications are all contemplated within the scope of the present disclosure.

In addition, although not expressly specified above, one or more steps of the method 200 may include a storing, displaying and/or outputting step as required for a particular application. In other words, any data, records, fields, and/or intermediate results discussed in the method can be stored, displayed and/or outputted to another device as required for a particular application. Furthermore, operations, steps, or blocks in FIG. 3 that recite a determining operation or involve a decision do not necessarily require that both branches of the determining operation be practiced. In other words, one of the branches of the determining operation can be deemed as an optional step. Furthermore, operations, steps or blocks of the above described method(s) can be combined, separated, and/or performed in a different order from that described above, without departing from the example embodiments of the present disclosure.

FIG. 3 depicts a high-level block diagram of a computing device or processing system specifically programmed to perform the functions described herein. For example, any one or more components or devices illustrated in FIG. 1 or described in connection with the method 200 may be implemented as the processing system 300. As depicted in FIG. 3, the processing system 300 comprises one or more hardware processor elements 302 (e.g., a microprocessor, a central processing unit (CPU) and the like), a memory 304, (e.g., random access memory (RAM), read only memory (ROM), a disk drive, an optical drive, a magnetic drive, and/or a Universal Serial Bus (USB) drive), a module 305 for detecting and modifying actions of visual representations of users in visual content, and various input/output devices 306, e.g., a camera, a video camera, storage devices, including but not limited to, a tape drive, a floppy drive, a hard disk drive or a compact disk drive, a receiver, a transmitter, a speaker, a display, a speech synthesizer, an output port, and a user input device (such as a keyboard, a keypad, a mouse, and the like).

Although only one processor element is shown, it should be noted that the computing device may employ a plurality of processor elements. Furthermore, although only one computing device is shown in the Figure, if the method(s) as discussed above is implemented in a distributed or parallel manner for a particular illustrative example, i.e., the steps of the above method(s) or the entire method(s) are implemented across multiple or parallel computing devices, e.g., a processing system, then the computing device of this Figure is intended to represent each of those multiple general-purpose computers. Furthermore, one or more hardware processors can be utilized in supporting a virtualized or shared computing environment. The virtualized computing environment may support one or more virtual machines representing computers, servers, or other computing devices. In such virtualized virtual machines, hardware components such as hardware processors and computer-readable storage devices may be virtualized or logically represented. The hardware processor 302 can also be configured or programmed to cause other devices to perform one or more operations as discussed above. In other words, the hardware processor 302 may serve the function of a central controller directing other devices to perform the one or more operations as discussed above.

It should be noted that the present disclosure can be implemented in software and/or in a combination of software and hardware, e.g., using application specific integrated circuits (ASIC), a programmable logic array (PLA), including a field-programmable gate array (FPGA), or a state machine deployed on a hardware device, a computing device, or any other hardware equivalents, e.g., computer readable instructions pertaining to the method(s) discussed above can be used to configure a hardware processor to perform the steps, functions and/or operations of the above disclosed method(s). In one example, instructions and data for the present module or process 305 for detecting and modifying actions of visual representations of users in visual content (e.g., a software program comprising computer-executable instructions) can be loaded into memory 304 and executed by hardware processor element 302 to implement the steps, functions or operations as discussed above in connection with the example method 200. Furthermore, when a hardware processor executes instructions to perform "operations," this could include the hardware processor performing the operations directly and/or facilitating, directing, or cooperating with another hardware device or component (e.g., a co-processor and the like) to perform the operations.

The processor executing the computer readable or software instructions relating to the above described method(s) can be perceived as a programmed processor or a specialized processor. As such, the present module 305 for detecting and modifying actions of visual representations of users in visual content (including associated data structures) of the present disclosure can be stored on a tangible or physical (broadly non-transitory) computer-readable storage device or medium, e.g., volatile memory, non-volatile memory, ROM memory, RAM memory, magnetic or optical drive, device or diskette and the like. Furthermore, a "tangible" computer-readable storage device or medium comprises a physical device, a hardware device, or a device that is discernible by the touch. More specifically, the computer-readable storage device may comprise any physical devices that provide the ability to store information such as data and/or instructions to be accessed by a processor or a computing device such as a computer or an application server.

While various embodiments have been described above, it should be understood that they have been presented by way of example only, and not limitation. Thus, the breadth and scope of a preferred embodiment should not be limited by any of the above-described example embodiments, but should be defined only in accordance with the following claims and their equivalents.

What is claimed is:

1. A method comprising:
    establishing, by a processing system including at least one processor, a communication session between at least a first communication system of a first user and a second communication system of a second user, the communication session including first visual content, the first visual content including a first visual representation of the first user;
    detecting, by the processing system, a first action of the first visual representation of the first user in the first visual content in accordance with a first action detection model for detecting the first action, wherein the first action comprises a movement of the first visual representation of the first user in a plurality of frames of the first visual content, wherein the first action detection model is one of a plurality of action detection models applied by the processing system to detect a plurality of different actions including the first action;
    modifying, by the processing system in response to the detecting the first action, the first visual content in accordance with a first configuration setting of the first user for the communication session, wherein the modifying comprises modifying the first action of the first visual representation of the first user in the first visual content based upon the first configuration setting; and
    transmitting, by the processing system, the first visual content that is modified to the second communication system of the second user.

2. The method of claim 1, wherein the first visual representation of the first user comprises:
    a video image of the first user; or
    an animated avatar associated with the first user.

3. The method of claim 1, wherein the first visual content is generated via the first communication system.

4. The method of claim 1, wherein the second communication system is to display the first visual content that is modified for the second user.

5. The method of claim 1, wherein the first configuration setting specifies a first modification to apply to the first action of the first visual representation of the first user in the first visual content.

6. The method of claim 5, wherein the first modification comprises at least one of:
    blocking at least a portion of the first visual representation of the first user in the first visual content;
    obfuscating at least a portion of the first visual representation of the first user in the first visual content;
    removing at least a portion of the first visual representation of the first user in the first visual content; or
    changing the first action of the first visual representation of the first user in the first visual content to a different action.

7. The method of claim 1, wherein the first action detection model comprises a machine learning model for detecting the first action, wherein the machine learning model is trained based upon at least one input of the first user regarding at least one segment of visual content including at least one visual representation of at least one user.

8. The method of claim 7, wherein the machine learning model identifies, from the at least one segment, features of the at least one visual representation of the at least one user that distinguish the first action from visual content that does not contain the first action.

9. The method of claim 8, wherein the features are from a feature space comprising quantified aspects of the visual content.

10. The method of claim 1, wherein the first action detection model comprises a machine learning model for detecting the first action, wherein the machine learning model is trained based upon at least one user input regarding at least one segment of visual content including at least one visual representation of at least one user.

11. The method of claim 1, wherein the communication session includes second visual content, the second visual content including a second visual representation of the second user.

12. The method of claim 11, further comprising:
    detecting a second action of the second visual representation of the second user in the second visual content in accordance with a second action detection model for detecting the second action, wherein the plurality of action detection models includes the second action detection model; and
    modifying, in response to the detecting the second action, the second visual content in accordance with the first configuration setting of the first user for the communication session.

13. The method of claim 12, further comprising:
    transmitting the second visual content that is modified to the first communication system of the first user.

14. The method of claim 12, further comprising:
    presenting the second visual content that is modified.

15. The method of claim 12, wherein the second action detection model comprises a second machine learning model for detecting the second action, wherein the second machine learning model is trained based upon at least one user input regarding at least one segment of visual content including at least one visual representation of at least one user.

16. The method of claim 1, wherein the first configuration setting is associated with at least one of:
    a physical location of the first user;
    a physical location of the second user;
    a time of day;
    a presence of at least one other individual besides the first user and the second user in the communication session;
    a relationship between the first user and the second user;
    a type of task for the communication session; or
    a topic of the communication session.

17. The method of claim 1, wherein the first configuration setting is associated with at least one of:

a capability of the first communication system;
a capability of the second communication system;
a capability of the processing system; or
a capability of a network supporting the communication session.

18. The method of claim 1, further comprising:
receiving a request to establish the communication session from at least one of the first communication system or the second communication system.

19. A non-transitory computer-readable medium storing instructions which, when executed by a processing system including at least one processor, cause the processing system to perform operations, the operations comprising:
establishing a communication session between at least a first communication system of a first user and a second communication system of a second user, the communication session including first visual content, the first visual content including a first visual representation of the first user;
detecting a first action of the first visual representation of the first user in the first visual content in accordance with a first action detection model for detecting the first action, wherein the first action comprises a movement of the first visual representation of the first user in a plurality of frames of the first visual content, wherein the first action detection model is one of a plurality of action detection models applied by the processing system to detect a plurality of different actions including the first action;
modifying, in response to the detecting the first action, the first visual content in accordance with a first configuration setting of the first user for the communication session, wherein the modifying comprises modifying the first action of the first visual representation of the first user in the first visual content based upon the first configuration setting; and
transmitting the first visual content that is modified to the second communication system of the second user.

20. A device comprising:
a processing system including at least one processor; and
a computer-readable medium storing instructions which, when executed by the processing system, cause the processing system to perform operations, the operations comprising:
establishing a communication session between at least a first communication system of a first user and a second communication system of a second user, the communication session including first visual content, the first visual content including a first visual representation of the first user;
detecting a first action of the first visual representation of the first user in the first visual content in accordance with a first action detection model for detecting the first action, wherein the first action comprises a movement of the first visual representation of the first user in a plurality of frames of the first visual content, wherein the first action detection model is one of a plurality of action detection models applied by the processing system to detect a plurality of different actions including the first action;
modifying, in response to the detecting the first action, the first visual content in accordance with a first configuration setting of the first user for the communication session, wherein the modifying comprises modifying the first action of the first visual representation of the first user in the first visual content based upon the first configuration setting; and
transmitting the first visual content that is modified to the second communication system of the second user.

\* \* \* \* \*